United States Patent
Scott et al.

(10) Patent No.: US 9,304,773 B2
(45) Date of Patent: Apr. 5, 2016

(54) DATA PROCESSOR HAVING DYNAMIC CONTROL OF INSTRUCTION PREFETCH BUFFER DEPTH AND METHOD THEREFOR

(75) Inventors: Jeffrey W. Scott, Austin, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 953 days.

(21) Appl. No.: 11/385,463

(22) Filed: Mar. 21, 2006

(65) Prior Publication Data

US 2007/0226462 A1    Sep. 27, 2007

(51) Int. Cl.
| G06F 15/00 | (2006.01) |
| G06F 7/38  | (2006.01) |
| G06F 9/00  | (2006.01) |
| G06F 9/44  | (2006.01) |
| G06F 9/38  | (2006.01) |
| G06F 9/30  | (2006.01) |
| G06F 12/08 | (2006.01) |

(52) U.S. Cl.
CPC .......... *G06F 9/3802* (2013.01); *G06F 9/30149* (2013.01); *G06F 9/3814* (2013.01); *G06F 12/0862* (2013.01); *G06F 2212/6022* (2013.01); *Y02B 60/1225* (2013.01)

(58) Field of Classification Search
USPC ........................................................ 712/207
See application file for complete search history.

(56) References Cited

U.S. PATENT DOCUMENTS

| 4,714,994 | A  | * | 12/1987 | Oklobdzija et al. ........... 712/207 |
| 5,408,625 | A  | * | 4/1995  | Narita et al. .................. 712/210 |
| 5,459,847 | A  | * | 10/1995 | Okamura ....................... 711/213 |
| 5,553,255 | A  |   | 9/1996  | Jain et al. |
| 5,623,615 | A  |   | 4/1997  | Salem et al. |
| 5,805,876 | A  |   | 9/1998  | Bose |
| 6,205,537 | B1 | * | 3/2001  | Albonesi ........................ 712/43 |
| 6,314,494 | B1 | * | 11/2001 | Keltcher et al. ............... 711/137 |
| 6,490,716 | B1 | * | 12/2002 | Gupta et al. .................... 716/18 |
| 6,574,727 | B1 |   | 6/2003  | Davidson et al. |
| 6,691,220 | B1 |   | 2/2004  | Guthrie et al. |
| 6,711,668 | B1 | * | 3/2004  | Wojcieszak et al. .......... 712/207 |
| 6,728,873 | B1 |   | 4/2004  | Guthrie et al. |
| 6,748,522 | B1 |   | 6/2004  | Gregoire et al. |

(Continued)

FOREIGN PATENT DOCUMENTS

| JP | 63-49937 | 3/1988 |
| JP | 2-18620  | 1/1990 |

(Continued)

OTHER PUBLICATIONS

"Algorithm for Instruction Cache Arbitration Among Multiple Instruction Streams," IBM Technical Disclosure Bulletin, vol. 39., No. 8, Aug. 1996, pp. 113-116.

(Continued)

*Primary Examiner* — George Giroux

(57) ABSTRACT

A data processor (102) includes a prefetch buffer (112) and a fetch control unit (116). The prefetch buffer (112) has a plurality of lines. The prefetch buffer (112) has a variable maximum depth that defines a number of lines of the plurality of lines that are capable of storing instructions. The fetch control unit (116) is coupled to the prefetch buffer to monitor at least one of the plurality of lines of the prefetch buffer (112) and to adjust the variable maximum depth of the prefetch buffer (112) in response to a state of the data processor (102).

20 Claims, 2 Drawing Sheets

(56) References Cited

U.S. PATENT DOCUMENTS

| | | |
|---|---|---|
| 6,751,724 B1 | 6/2004 | Moyer et al. |
| 6,775,765 B1 | 8/2004 | Lee et al. |
| 6,832,280 B2 | 12/2004 | Malik et al. |
| 6,871,246 B2 | 3/2005 | Moyer |
| 2002/0053038 A1* | 5/2002 | Buyuktosunoglu et al. ... 713/320 |
| 2003/0033461 A1 | 2/2003 | Malik et al. |
| 2003/0105926 A1* | 6/2003 | Rodriguez ............ 711/129 |
| 2004/0148548 A1 | 7/2004 | Moyer et al. |
| 2004/0186973 A1 | 9/2004 | Moyer et al. |
| 2004/0193831 A1 | 9/2004 | Moyer |
| 2004/0205298 A1* | 10/2004 | Bearden et al. ......... 711/137 |
| 2004/0225758 A1 | 11/2004 | Moyer |
| 2004/0260908 A1 | 12/2004 | Malik et al. |
| 2005/0055543 A1 | 3/2005 | Moyer |
| 2005/0132173 A1 | 6/2005 | Moyer et al. |
| 2005/0138255 A1 | 6/2005 | Moyer et al. |
| 2005/0210201 A1* | 9/2005 | So et al. ............... 711/137 |
| 2005/0273310 A1 | 12/2005 | Newburn |
| 2006/0036812 A1 | 2/2006 | Moyer et al. |
| 2006/0224872 A1 | 10/2006 | Shihadeh |

FOREIGN PATENT DOCUMENTS

| | | |
|---|---|---|
| JP | 02-157938 | 6/1990 |
| JP | 4-97463 | 3/1992 |
| JP | 7-28751 | 1/1995 |
| JP | 07-182164 | 7/1995 |
| WO | 9914667 A1 | 3/1999 |

OTHER PUBLICATIONS

"Dealer Instruction Processing Unit Governor—Determining the Segment Switch Depth," IBM Technical Disclosure Bulletin, vol. 36, No. 06A, Jun. 1993, pp. 235-236.

International Search Report and Written Opinion for correlating PCT Patent Application No. PCT/US07/62651 dated Jul. 8, 2008.

EPC International Search Report and Written Opinion regarding PCT/US2007/062651, dated May 8, 2009.

English translation of text of JP02-157938.

English translation of text of JP07-18264.

English translation of text of JP63-49937.

* cited by examiner

DATA PROCESSOR HAVING DYNAMIC CONTROL OF INSTRUCTION PREFETCH BUFFER DEPTH AND METHOD THEREFOR

FIELD OF THE DISCLOSURE

The present disclosure relates generally to data processors, and more particularly, to systems and methods of managing instruction prefetch buffers of data processors.

BACKGROUND

Generally, computing systems such as personal computers, personal digital assistants, cellular and digital telephones, and other processor-based devices include data processors in the form of microprocessors for processing computer-readable instructions. A microprocessor is a single-chip data processor that includes an instruction decoder to decode the computer-readable instructions and one or more execution units to execute the decoded instructions. The execution units perform most of the actions responsible for application programs to function.

Modern microprocessors typically include several features to improve performance. One of these features is on-chip cache memory. Cache memory is a high-speed local memory that utilizes the locality of instruction fetching (in the case of an instruction cache) or data references (in the case of a data cache) to prevent pipeline stalling due to the relatively slow access time of main memory.

While the use of instruction caches in particular has greatly improved microprocessor performance, some performance obstacles remain. One of these is the fact that a cache access itself requires a certain amount of time, even if the instruction fetch hits in the cache. If as is common the microprocessor uses memory management and the cache is a physical cache storing data corresponding to physical addresses, any cache access requires an address translation step. Another obstacle is superscalar design, which allows microprocessors to issue more than one instruction per cycle, thereby increasing the demand for instructions to be returned from the cache. As a result of these conditions if an instruction fetch misses in the cache, the instruction pipeline may be stalled due to instruction starvation while the cache fetches the requested instruction from relatively slow main memory.

Thus some high-end microprocessors have started to use a feature that was common in early mainframe computers. This feature is the use of prefetch buffers for fetching instructions. A prefetch buffer is a set of registers that store instructions that have been pre-loaded from the cache or from main memory in a first-in, first-out (FIFO) fashion. Prefetch buffers prevent instruction starvation that might otherwise occur during cache or main memory accesses, but have limitations of their own. One limitation is that some microprocessors support variable length instructions, which may cause inefficient usage of the prefetch buffer.

Another limitation is that particular types of instructions, such as branch instructions, may result in a change of flow for the data processor. By the time such an instruction is decoded and recognized to be a branch instruction by the instruction decoder, multiple instructions following the branch instruction may have been fetched and loaded into the prefetch buffer that will not be needed if the branch is taken. Consequently, instructions may be loaded from memory only to be subsequently discarded from the prefetch buffer. The discarded instructions represent wasted power in the form of unnecessary fetch operations.

DETAILED DESCRIPTION OF THE DRAWINGS

Figure 1:
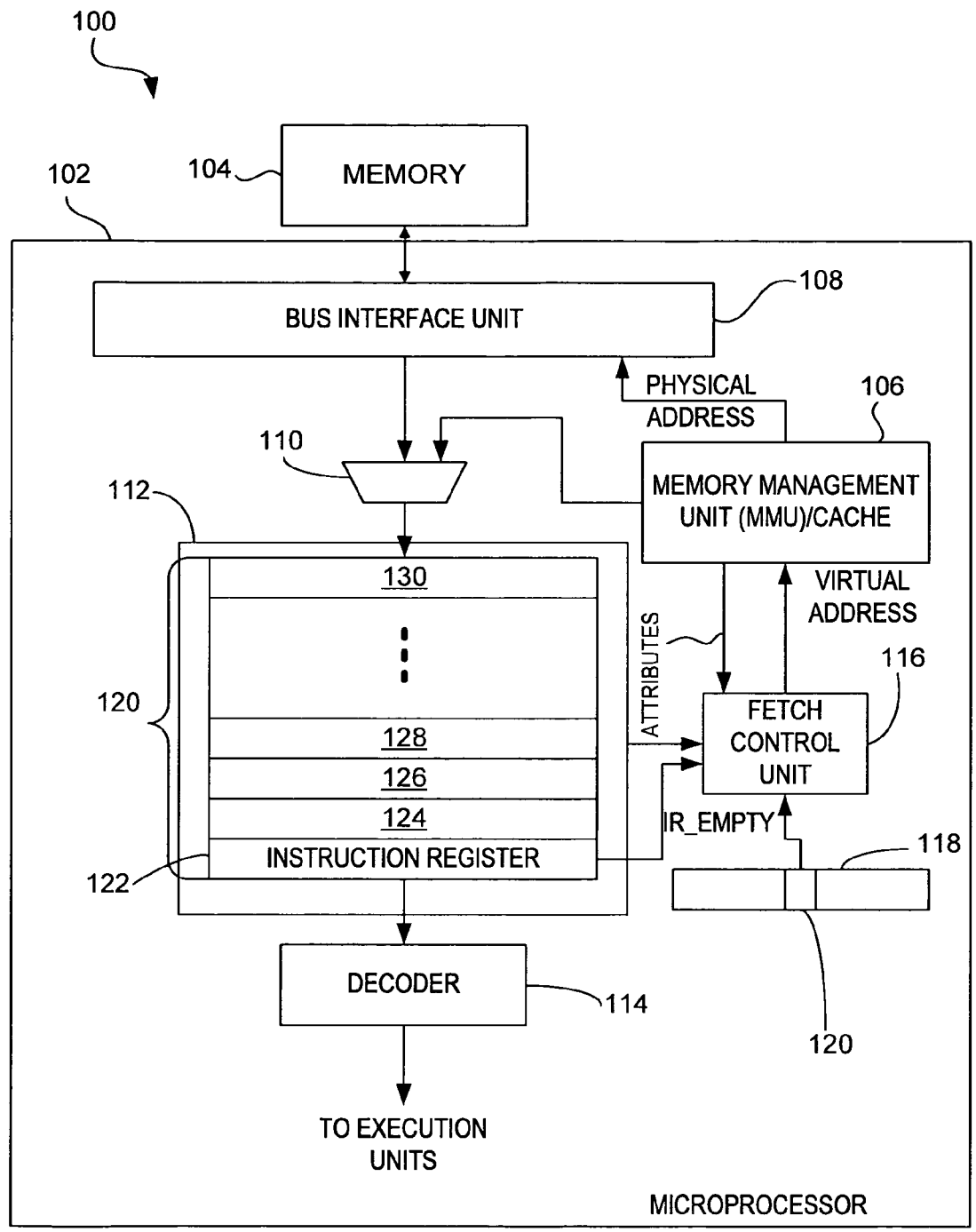
FIG. 1 is a block diagram illustrating a portion of a data processing system including a processor having a fetch control unit according to an embodiment of the present invention.

According to one aspect of the present invention, a data processor includes a prefetch buffer and a fetch control unit. The prefetch buffer includes a plurality of lines, and has a variable maximum depth that defines a number of lines of the plurality of lines that are capable of storing instructions. The fetch control unit is coupled to the prefetch buffer to monitor at least one of the plurality of lines of the prefetch buffer and to adjust the variable maximum depth of the prefetch buffer in response to a state of the data processor.

According to this aspect, the fetch control unit may monitor a first line of the prefetch buffer, determined by the variable maximum depth, and initiate an instruction fetch when the first line is empty.

The fetch control unit may also be adapted to set the variable maximum depth of the prefetch buffer to a first predetermined depth or to a second predetermined depth.

The fetch control unit may further set the variable maximum depth of the prefetch buffer in response to an instruction type. In this case the fetch control unit may set the variable maximum depth of the prefetch buffer to a first predetermined depth or a second predetermined depth in response to the instruction type. The instruction type can be one of 32-bit instructions and 16-bit instructions, or alternatively can be one of 32-bit instructions and variable-length instructions.

The fetch control unit may yet further dynamically adjust the variable maximum depth of the prefetch buffer. In this case the fetch control unit may increase the variable maximum depth in response to a starvation condition of the prefetch buffer. The starvation condition may be that a frequency of instruction starvation exceeds a threshold, in which case the fetch control unit increases the variable maximum depth in response to the starvation condition. The starvation condition may also be whether the prefetch buffer is not averaging close to starvation, in which case the fetch control unit decreases the variable maximum depth in response to the starvation condition. In this latter case the fetch control unit may determine whether the prefetch buffer is averaging close to starvation by monitoring a state of a plurality of lines of the prefetch buffer.

According to another aspect, a data processor includes a register, a prefetch buffer, and a fetch control unit. The register stores an instruction prefetch control value that indicates that the data processor is operating in a selected one of a plurality of modes. The prefetch buffer includes a plurality of lines, the prefetch buffer having a variable maximum depth that defines a number of lines of the plurality of lines that are capable of storing instructions. The fetch control unit is coupled to the prefetch buffer and to the register, the fetch control unit controlling the variable maximum depth in response to the instruction prefetch control value.

According to this other aspect, the fetch control unit may set the variable maximum depth of the prefetch buffer to a first predetermined depth or to a second predetermined depth in response to the instruction prefetch control value being respectively a first value or a second value. Alternatively, the fetch control unit may set the variable maximum depth of the prefetch buffer to one of first and second predetermined depths, determined at least in part by a current instruction type, in response to the instruction prefetch control value being a predetermined value. Likewise the fetch control unit may set the variable maximum depth of the prefetch buffer dynamically in response to the instruction prefetch control value being a predetermined value. In this case, the fetch control unit may increase or decrease the variable maximum depth of the prefetch buffer dynamically in response to a starvation condition of the prefetch buffer.

According to a further aspect, a method is adapted for use in a data processor having a prefetch buffer with a plurality of lines and a variable maximum depth that defines a number of lines of the plurality of lines that are capable of storing instructions. A starvation condition of the prefetch buffer is monitored. If a rate of starvation of the prefetch buffer exceeds a threshold, then the variable maximum depth is increased. If the prefetch buffer is not averaging close to starvation, then the variable maximum depth is decreased.

According to this further aspect, instructions may be fetched into the prefetch buffer configured according to the variable maximum depth. Moreover, instructions may be outputted from the prefetch buffer, and instructions so outputted may be decoded for execution by the data processor.

Now turning to the drawings, FIG. 1 is a block diagram illustrating a portion of a data processing system 100 including a data processor 102 having a fetch control unit 116 according to an embodiment of the present invention. Data processing system 100 includes generally data processor 102 and a memory 104. Note that data processor 102 can be variously implemented as a microprocessor, a microcontroller, a digital signal processor (DSP), and intelligent direct memory access (DMA) controller, etc. Data processor 102 is connected to memory 104 over a bidirectional bus conducting address, data, and control signals, and may use any conventional memory bus architecture such as double data rate (DDR) synchronous dynamic random access memory (SDRAM).

Data processor 102 includes a memory management unit (MMU)/cache 106, a bus interface unit (BIU) 108, a multiplexer (MUX) 110, a prefetch buffer 112, a decoder 114, a fetch control unit 116, and a register 118. In general, MMU/cache 106 has an input for receiving a virtual address labeled "VIRTUAL ADDRESS", a first output for providing a physical address labeled "PHYSICAL ADDRESS, a second output for providing data, and a third output for providing attributes related to the translated VIRTUAL ADDRESS labeled "ATTRIBUTES". BIU 108 has an input connected to the first output of MMU/cache 106, a bidirectional terminal connected to memory 104, and a data output terminal. MUX 110 has a first input terminal connected to the output terminal of BIU 108, a second input terminal connected to the second output terminal of MMU/cache 106, and an output terminal. Prefetch buffer 112 has an input terminal connected to the output terminal of MUX 110, a first output terminal for providing an output instruction, a second output terminal for providing information relating to the instructions stored therein, and a third output terminal for providing a signal labeled "IR_EMPTY". Decoder 114 has an input terminal connected to the first output terminal of prefetch buffer 112, and an output terminal for providing decoded output signals, directly or indirectly, to the execution units of data processor 102 (not shown in FIG. 1). Fetch control unit 116 has input terminals connected to the second and third output terminals of prefetch buffer 112 in a manner to be more fully described below, a first control input terminal, a second control input terminal connected to the third output terminal of MMU/cache 106 for receiving the ATTRIBUTES therefrom, and an output terminal connected to the input terminal of MMU/cache 106 for providing the VIRTUAL ADDRESS thereto. Register 118 has an output terminal connected to the first control input terminal of fetch control unit 116.

In general operation, data processor 102 is a high-performance microprocessor that uses a prefetch buffer 112 to help prevent instruction starvation. Fetch control unit 116 monitors the state of prefetch buffer 112 and generates virtual addresses to initiate instruction fetches. In response to receiving the VIRTUAL ADDRESS, MMU/cache 106 first performs a virtual-to-physical address translation by accessing stored translations from a translation look-aside buffer (TLB) included in MMU/cache 106. If the translation is not present in the TLB, MMU/cache 106 initiates a table walking procedure to load a corresponding translation from a page table stored in memory 104. MMU/cache 106 uses the translation in the TLB to perform attribute checking as well as address translation, and provides the attributes of the selected page as the ATTRIBUTES signal to fetch control unit 116. After MMU/cache 106 performs the address translation, the cache portion of MMU/cache 106 is checked to see if the accessed instruction is present. If the instruction is present in the cache, a condition known as a cache hit, then MMU/cache 106 provides the data so accessed to the second input of MUX 110, and causes it to be selected for input to prefetch buffer 112. If the data is not present in MMU/cache 106, a condition known as a cache miss, then MMU/cache 106 accesses memory 104 by providing the PHYSICAL ADDRESS to BIU 108. BIU 108 performs the bus access by providing the PHYSICAL ADDRESS and appropriate control signals to memory 104. In response memory 104 provides the requested instruction on the data bus to the first input of MUX 110, through which the requested instruction is provided to prefetch buffer 112. Note that the instruction is also stored in the cache of MMU/cache 106 for later use, but this operation is conventional and will not be described further.

Prefetch buffer 112 includes a set of lines or registers 120, such as representative lines 122, 124, 126, 128, and 130 illustrated in FIG. 1. Depending on the implementation, the number of lines 120 may vary but in the illustrated embodiment prefetch buffer 112 has 10 lines. Line 122, which is the last line in prefetch buffer 112, contains the next instruction (or portion of the next instruction if the instruction length exceeds one line) for presentation to decoder 114 and is referred to as the "INSTRUCTION REGISTER". Each line of the set of lines 120 is capable of storing an instruction or portion of an instruction if the instruction length exceeds one line. The instructions are shifted through prefetch buffer 112 in a first-in, first-out (FIFO) fashion and advanced by one instruction for each instruction read by decoder 114.

Prefetch buffer 112 also has a variable maximum depth, which refers to the number of lines 122, 124, 126, 128, and 130 of the prefetch buffer 112 that are capable of storing an instruction when the buffer is considered to be full. Since instruction register 122 is the last (or oldest) location, the variable maximum depth determines the first (or newest) location in set of lines 120 that is capable of storing instructions. As will be explained below, the maximum buffer depth can advantageously be fewer than all the lines of prefetch buffer 112.

Fetch control unit 116 includes a program counter, increment logic, and various decoders and buffer state machines as will be described more fully below. Fetch control unit 116 monitors the first line of prefetch buffer 112 (determined by the variable maximum depth set by fetch control unit 116) and initiates an instruction fetch when that line is empty. Fetch control unit 116 initiates the instruction fetch by generating the VIRTUAL ADDRESS and providing a request signal to MMU/cache 106, which eventually causes the next instruction to be loaded into the oldest available line of prefetch buffer 112.

Register 118 includes a 2-bit field 120 known as the instruction prefetch control (IPC) field that stores an instruction prefetch control value to define the operation of fetch control unit 116 and prefetch buffer 112. The encoding of field 120 is illustrated in TABLE 1:

TABLE 1

| IPC[1:0] | Configuration |
|---|---|
| 00 | 10 prefetch buffers available |
| 01 | 4 prefetch buffers available |
| 10 | 10 buffers in BookE mode, 5 buffers in VLE mode |
| 11 | Hardware dynamic mode |

The first two modes (IPC[1:0]=00 or 01, respectively) cause fetch control unit 116 to set the maximum buffer depth at 10 lines and 4 lines, respectively. By setting the maximum buffer depth at 10 lines, the operating system provides the least chance of instruction starvation, but at a cost of increased power consumption due to unnecessary instruction fetches. Alternatively by setting the maximum buffer depth at 4 lines, the operating system provides reduced power consumption but at a cost of occasional starvation and somewhat lower performance.

In the third mode (IPC[1:0]=10), the maximum buffer depth is set by the current instruction size. Thus if the current instruction size is 32-bit, fetch control unit 116 sets the maximum buffer depth at 10 buffers. However if the current instruction size is variable-length, then fetch control unit 116 sets the maximum buffer depth at 5 buffers. Fetch control unit 106 determines the current instruction size by receiving the ATTRIBUTE signal from the MMU in MMU/cache 106 to indicate the instruction format of the memory page accessed by the last instruction fetch.

In the particular example, data processor 102 is a microprocessor that executes either 32-bit instructions from the "BookE" instruction set of the PowerPC family of microprocessors sold by Freescale Corporation, or instructions having variable length encoding (VLE). In another embodiment, fetch control unit 116 could provide 10 buffers when executing 32-bit instructions of the so-called "ARM" instruction set or 5 buffers when executing 16-bit instructions of the so-called "Thumb" instruction set that are used in microprocessors designed by Advanced RISC Machines, Ltd. However it should be apparent that these two instruction sets are merely exemplary.

Moreover the method of determining which type of instructions are being implemented can also vary. In the illustrated processor, MMU/cache 106 identifies the instruction type by a corresponding attribute in the page table and fetch control unit 116 controls the depth of prefetch buffer 112 in response to the corresponding one of the ATTRIBUTES. In the alternative ARM/Thumb embodiment, fetch control unit 116 could switch between the two maximum prefetch buffer depths based on decoding a special instruction that switches between the ARM and Thumb instruction sets, known as the branch and exchange instruction, rather than by examining an attribute of the memory page accessed by the last instruction fetch. In this case decoder 114 would provide an ARM/THUMB control signal to fetch control unit 116 in response to decoding the branch and exchange instruction.

In the fourth mode (IPC[1:0]=11), known as hardware dynamic mode, fetch control unit 116 sets the maximum prefetch buffer depth dynamically. In hardware dynamic mode, the variable maximum depth is set as follows. Fetch control unit 116 detects the instruction starvation condition by receiving the IR_EMPTY signal from instruction register 122 indicating that it is empty and by monitoring its internal buffer state machines. Fetch control unit 116 dynamically adjusts the maximum prefetch buffer depth to reduce starvation to an acceptable level. If the rate of starvation exceeds a threshold, then fetch control unit 116 increases the maximum buffer depth by one line. Fetch control unit 116 repeats this process until it determines that the rate of starvation no longer exceeds the threshold.

On the other hand in hardware dynamic mode fetch control unit 116 also selectively decreases the variable maximum depth based on determining that prefetch buffer 112 is not operating close to starvation. One way to determine this condition is for fetch control unit 116 to monitor either all lines, or at least multiple lines, in the last stages of prefetch buffer 112. It then judges prefetch buffer 112 as "not close to starvation" by comparing the fullness of the buffer to a threshold, averaged over time. If fetch control unit 116 determines that prefetch buffer 112 is in the "not close to starvation" state, then fetch control unit 116 reduces the variable maximum depth.

The availability of these modes provides the user flexibility to reduce power consumption without negatively impacting performance. The first two modes allow explicit operating system or software control of the maximum prefetch buffer depth. The third mode allows the maximum prefetch buffer depth to be determined by the instruction type. The fourth mode allows the hardware to dynamically adjust the maximum prefetch buffer depth depending on conditions in the processor, such as prefetch buffer 112 itself, which will vary as the software running on data processor 102 varies. Thus the availability of both explicit software control and hardware control of maximum prefetch buffer depth provides the user with increased flexibility to attain the optimum balance between performance and power consumption.

Figure 2:
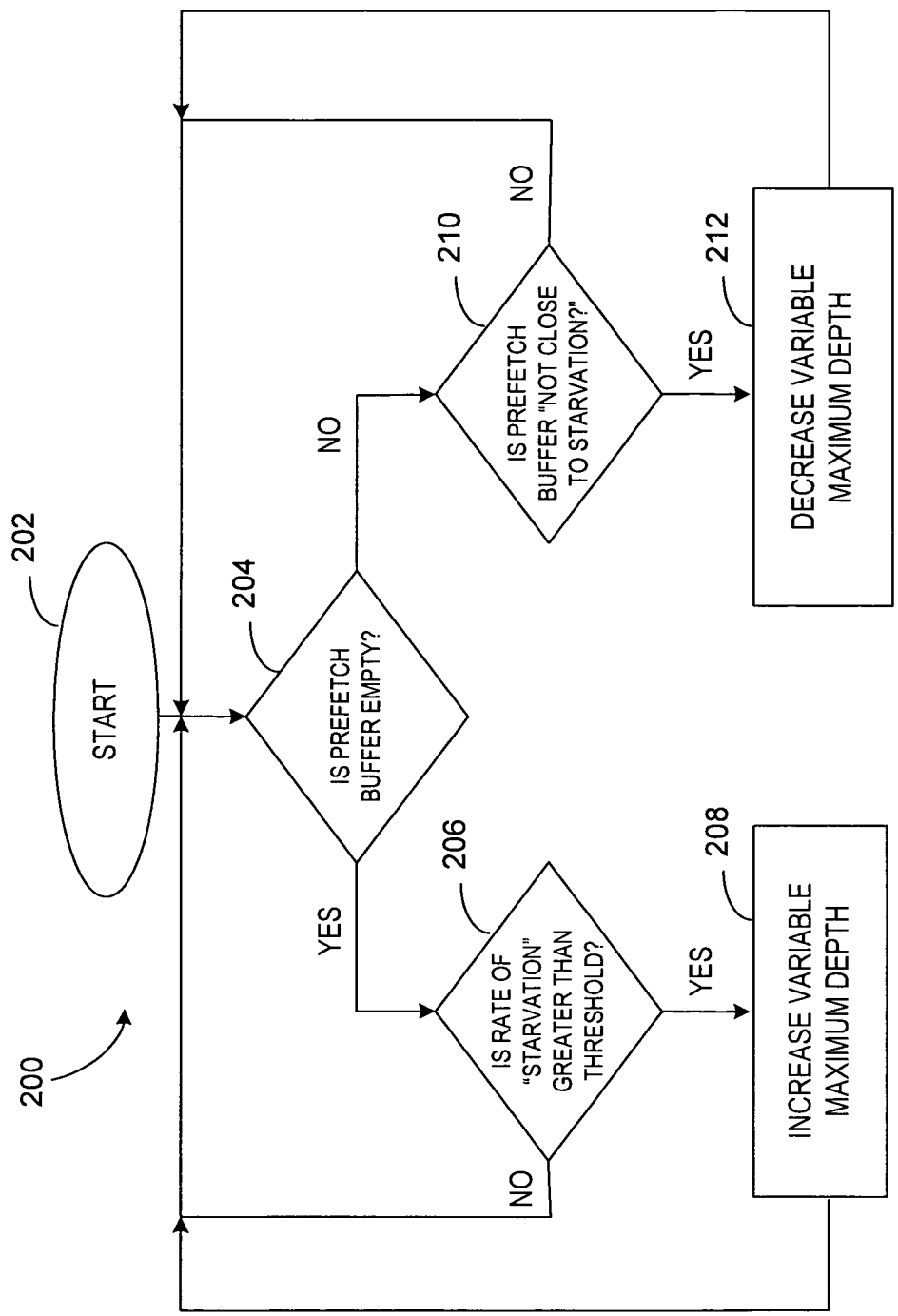
FIG. 2 is a flow diagram illustrating hardware dynamic control of instruction prefetch buffer depth of the processor of FIG. 1.

FIG. 2 is a flow diagram 200 illustrating one exemplary method that can be used for hardware dynamic control of instruction prefetch buffer depth of data processor 102 of FIG. 1. Flow starts at box 202. At decision box 204, fetch control unit 116 determines whether prefetch buffer 112 is empty by sampling the IR_EMPTY signal from line 122 of prefetch buffer 112. If prefetch buffer 112 is empty (IR_EMPTY is true), then flow proceeds to decision box 206. At decision box 206, if the calculated rate of starvation does not exceed a threshold, then flow returns to decision box 204. If however the calculated rate of starvation does exceed a threshold, then flow proceeds to step 208. At step 208, fetch control unit 116 increases the maximum buffer length such as by incrementing it by one (assuming it is not already equal to the maximum number of lines in set 120), and returns flow to decision box 204.

If prefetch buffer 112 is not empty (IR_EMPTY is false), then flow proceeds to decision box 210. Decision box 210 determines whether prefetch buffer 112 is "not close to starvation". For example fetch control unit 116 may monitor several of the last entries in prefetch buffer 112 and determine when they all contain valid instructions. In a particular example fetch control unit 116 would determine that prefetch buffer 112 is not close to starvation if all of lines 122, 124, 126, and 128 are valid. This "not close to starvation" condition indicates that the software currently being executed does not need as many prefetch buffers to avoid starvation as is currently allocated, and would be the result of characteristics such as the frequency of change of flow instructions, memory accesses, and the like. If the answer to the "not close to starvation" question is NO, i.e. prefetch buffer 112 is operating close to starvation, then flow returns to decision box 204. If however the answer to the "not close to starvation" question is YES, then flow proceeds to box 212, at which point fetch control unit 116 decreases the variable maximum depth, and flow returns to decision box 204.

In order to implement the method of FIG. 2, fetch control unit 116 will need to maintain various counters, state machines, and the like. The implementation of these structures will be apparent to those of ordinary skill in the art. Moreover fetch control unit 116 needs to monitor the state of prefetch buffer 112 as well as its internal state machines when switching between modes. For example, when fetch control unit determines the "not close to starvation" condition exists, it may not be able to immediately decrease the variable maximum buffer depth, but only to decrease it as prefetch buffer 112 drains to within the new depth.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data processor comprising:
    a prefetch buffer comprising a plurality of lines, the prefetch buffer to store instructions in a first-in, first-out (FIFO) fashion and the prefetch buffer having a variable maximum depth that defines a number of lines of the plurality of lines that are capable of storing instructions; and
    a fetch control unit coupled to the prefetch buffer to adjust, during operation of the data processor, the variable maximum depth of the prefetch buffer in response to an instruction type, wherein the fetch control unit is further configured to adjust the variable maximum depth in response to a starvation condition of the prefetch buffer.

2. The data processor of claim 1, wherein the fetch control unit further is to monitor a first line of the prefetch buffer, determined by the variable maximum depth, and to initiate an instruction fetch when the first line is empty.

3. The data processor of claim 1, wherein the fetch control unit is adapted to set the variable maximum depth of the prefetch buffer to a first predetermined depth or to a second predetermined depth.

4. The data processor of claim 1 wherein the fetch control unit sets the variable maximum depth of the prefetch buffer to a first predetermined depth or a second predetermined depth in response to the instruction type.

5. The data processor of claim 4, wherein the instruction type comprises one of 32-bit instructions and 16-bit instructions.

6. The data processor of claim 1, wherein the starvation condition comprises a frequency of instruction starvation exceeding a threshold and the fetch control unit increases the variable maximum depth in response to the starvation condition.

7. The data processor of claim 1, wherein the starvation condition comprises whether the prefetch buffer is not averaging close to starvation.

8. The data processor of claim 7, wherein the fetch control unit determines whether the prefetch buffer is averaging close to starvation by monitoring a state of a plurality of lines of the prefetch buffer.

9. A data processor comprising:
    a register for storing an instruction prefetch control value that indicates that the data processor is operating in a selected one of a plurality of modes;
    a prefetch buffer comprising a plurality of lines, the prefetch buffer to store instructions in a first-in, first-out (FIFO) fashion and the prefetch buffer having a variable maximum depth that defines a number of lines of the plurality of lines that are capable of storing instructions; and
    a fetch control unit coupled to the prefetch buffer and to the register, the fetch control unit controlling the variable maximum depth in response to the instruction prefetch control value and adjusting the variable maximum depth during operation of the data processor in response to a starvation condition of the prefetch buffer.

10. The data processor of claim 9, wherein the fetch control unit sets the variable maximum depth of the prefetch buffer to a first predetermined depth or to a second predetermined depth in response to the instruction prefetch control value being respectively a first value or a second value.

11. The data processor of claim 9, wherein the fetch control unit increases or decreases the variable maximum depth of the prefetch buffer dynamically in response to a starvation condition of the prefetch buffer.

12. A method comprising:
    providing a data processor having a prefetch buffer to store instructions in a first-in, first-out (FIFO) fashion, the prefetch buffer having a plurality of lines;
    setting, during operation of the data processor, a variable maximum depth of the prefetch buffer as a number of lines of the plurality of lines that are capable of storing instructions;
    fetching instructions into the prefetch buffer using the variable maximum depth; and
    dynamically adjusting the variable maximum depth in response to a state of the data processor based on a starvation condition of the prefetch buffer.

13. The method of claim 12, wherein dynamically adjusting comprises:
    monitoring a starvation condition of the prefetch buffer;
    if a rate of starvation of the prefetch buffer exceeds a threshold, then increasing the variable maximum depth; and
    if the prefetch buffer is not averaging close to starvation, then decreasing the variable maximum depth.

14. The method of claim 13, further comprising:
outputting instructions from the prefetch buffer; and
    decoding instructions so outputted for execution by the data processor.

15. A method comprising:
    providing a data processor having a prefetch buffer to store instructions in a first-in, first-out (FIFO) fashion, the prefetch buffer having a plurality of lines;
    setting a variable maximum depth of the prefetch buffer to a first predetermined depth;
    fetching instructions of a first instruction type into the prefetch buffer;
    subsequently fetching instructions of a second instruction type into the prefetch buffer;
    changing the variable maximum depth of the prefetch buffer from the first predetermined depth to a second predetermined depth in response to fetching instructions of the second instruction type; and adjusting the variable maximum depth in response to a starvation condition of the prefetch buffer.

16. The method of claim 15, wherein fetching instructions of the first instruction type comprises fetching 32-bit instructions, and fetching instructions of the second instruction type comprises fetching 16-bit instructions.

17. The method of claim 15, wherein fetching instructions of the first instruction type comprises fetching 32-bit instructions, and fetching instructions of the second instruction type comprises fetching variable-length instructions.

18. The method of claim 15, wherein the adjusting the variable maximum depth in response to the starvation condition of the prefetch buffer comprises:

increasing the variable maximum depth in response to the starvation condition, wherein starvation condition comprises a frequency of instruction starvation exceeding a threshold.

19. The method of claim 15, wherein the adjusting the variable maximum depth in response to the starvation condition of the prefetch buffer comprises:

adjusting the variable maximum depth in response to the prefetch buffer averaging close to starvation.

20. The method of claim 19, wherein the adjusting the variable maximum depth in response to the prefetch buffer averaging close to starvation comprises:

monitoring a state of a plurality of lines of the prefetch buffer.

\* \* \* \* \*